(12) United States Patent
Beuschel et al.

(10) Patent No.: US 7,995,190 B2
(45) Date of Patent: Aug. 9, 2011

(54) PROCEDURE AND A DEVICE FOR MEASURING DISTANCE

(75) Inventors: Michael Beuschel, Kösching (DE); Gerhard Zörkler, Schrobenhausen (DE)

(73) Assignee: Conti Temic Microelectronic, GmbH, Nurnberg (DE)

( * ) Notice: Subject to any disclaimer, the term of this patent is extended or adjusted under 35 U.S.C. 154(b) by 279 days.

(21) Appl. No.: 10/576,662

(22) PCT Filed: Jul. 22, 2004

(86) PCT No.: PCT/DE2004/001596
§ 371 (c)(1),
(2), (4) Date: Dec. 22, 2006

(87) PCT Pub. No.: WO2005/045464
PCT Pub. Date: May 19, 2005

(65) Prior Publication Data
US 2007/0115166 A1 May 24, 2007

(30) Foreign Application Priority Data
Oct. 31, 2003 (DE) .................................. 103 51 067

(51) Int. Cl.
*G01C 13/00* (2006.01)
(52) U.S. Cl. .................. 356/5.01; 342/135; 342/134

(58) Field of Classification Search ............. 356/3–5.15; 342/118–146
See application file for complete search history.

(56) References Cited

U.S. PATENT DOCUMENTS

| | | | | |
|---|---|---|---|---|
| 3,730,628 A | * | 5/1973 | Wolcott et al. | 356/5.11 |
| 4,533,241 A | | 8/1985 | Masunaga et al. | |
| 5,076,687 A | * | 12/1991 | Adelson | 356/4.04 |
| 5,191,385 A | | 3/1993 | Kasser | |
| 5,349,358 A | * | 9/1994 | Canal | 342/128 |
| 6,087,980 A | * | 7/2000 | Saryo | 342/128 |

FOREIGN PATENT DOCUMENTS

| | | |
|---|---|---|
| DE | 4005919 | 4/1991 |
| EP | 0312524 | 4/1989 |
| WO | 9960419 | 11/1999 |

\* cited by examiner

*Primary Examiner* — Thomas H Tarcza
*Assistant Examiner* — Timothy A Brainard

(57) ABSTRACT

Disclosed is a method for measuring a distance between a distance sensor (5), which is carried on a vehicle, and an object (2). The method includes emitting electromagnetic impulse signals (6) and receiving signals (7), which are reflected by the object. Subsequently the signal propagation time is determined. Pulses (10) received after having been reflected by the object (2) are separated and added together, after which the mean value is formed, and the received pulses are superimposed with a modulation signal (18). Also disclosed is a device suited for carrying out the method.

9 Claims, 5 Drawing Sheets

Prior Art

PROCEDURE AND A DEVICE FOR MEASURING DISTANCE

BACKGROUND OF THE INVENTION

The invention relates to a procedure for measuring distance between a distance sensor which is carried, or which can be carried by a motor vehicle and an object by emitting electrical impulse signals and receiving signals reflected by the object, and by subsequently calculating the signal propagation delay. The invention furthermore relates to a device which is provided and which is suited for carrying out the procedure.

An approach to distance measurement by processing optical impulse signals is known from EP 0 312 524 B1. This approach involves increasing the signal strength of the signals received in a suitable manner in order to process the signals efficiently, thus making it possible overall to measure the distance over the desired distance range to an adequate degree of reliability. For this purpose, it is recommended that the signals received are added together in a discrete form. This adding together of the sensed values of the periodically emitted impulse repetitions, which are related in each case to corresponding sensing time points, causes the setpoint of the evaluated reception signals to be increased, and should therefore contribute to achieving the desired increase in the sensitivity of the arrangement as a whole.

SUMMARY OF THE INVENTION

In this respect, the invention follows another path. The aim is namely to reconstruct the received signal as well as possible, in order to enable the received signal to be allocated to the emitted signal on a qualified basis. In other words, the object of the invention is to provide a procedure which is simultaneously characterised by an adequate level of sensitivity on the one hand, so that small and, if appropriate, dark objects can be identified, while on the other hand, by a broad dynamic range, so that reliable measuring results can be delivered up to very short distances and when reflective obstructions are present.

According to the invention, this object is attained by a procedure for measuring distance between a distance sensor (5) which is carried by a motor vehicle (1) and an object (2) by emitting electromagnetic impulse signals (6) and by receiving signals (7) which are reflected by the object (2). The signal (7) which is reflected by the object (2) comprises a related sequence of pulses (10), each pulse (10) being discretised in order to attain a sensed pulse (14), and the sensed pulses (14) being added together characterised in that a modulation signal (18) is superimposed onto the received pulses (10) prior to discretisation and addition. For this purpose, with a procedure for measuring distance between a distance sensor, which is carried in particular by a motor vehicle, and an object, each pulse is discretised by emitting electromagnetic impulse signals, the signal which is reflected by the object comprising a related sequence of pulses, in order to attain a sensed pulse, the sensed pulses being added together and the pulses received being superimposed with a modulation signal prior to the discretisation and addition.

The invention is based on the consideration that sensors are used which emit several pulses (pulse sequence) in each measuring cycle, and that a pulse sequence is in turn received as a reflected signal, each pulse received being sensed for further processing in order to attain a sensed pulse, and thus a sequence of sensed pulses, for each pulse received.

Furthermore, the invention is based on the realisation that the signal-to-noise ratio (SNR) will also not be significantly improved by integrating several pulses, e.g. by adding them together and then forming the mean, provided that the amplitude of the analogue noise is lower than the quantisation noises.

In order to add together the individual sensed pulses, the first respective sensed value of each sensed pulse is added in order to attain the first node of a resulting total pulse. Then, the second respective sensed value of each sensed pulse is added, in order to attain the second node of the resulting total pulse, etc. In order to form a mean, the value of the individual nodes of the resulting total pulse is divided by the number of sensed pulses. This then produces a resulting signal which is the best possible approximation of the received pulse, despite the loss of information caused by the discretisation.

In order to achieve targeted offset modulation of the signal to be sensed, namely the sequence of received pulses, the received pulses are superimposed with an additional analogue signal. The received pulses are preferably superimposed with the analogue signal prior to discretisation, addition and formation of the mean.

The advantage of the invention lies in that alongside specified or specifiable, generally equidistant quantisation levels, additional, virtual quantisation levels arise between the specified or specifiable quantisation levels. These virtual quantisation levels give rise to a largely well detailed representation of the received signals as compared to the specified quantisation levels.

The superimposed signal, designated in the following as the modulation signal, is a known, e.g. non-stochastically distributed signal, which comprises a constant amplitude distribution via a measuring cycle (i.e. during a specifiable or specified number of pulses to be integrated/to be added together).

With regard to the modulation signal, the following specified individual properties or combinations are used as particularly advantageous modulation types.

The modulation signal is thus preferably used with a specified amplitude distribution which remains constant during a related sequence of received pulses.

It has also been shown to be advantageous when the modulation signal is distributed uniformly and its amplitude corresponds to a quantisation level during discretisation of the received pulses, or to an integral multiple of such a quantisation level.

Furthermore, it is advantageous when the number of the sensed pulses which belong together and the number of quantisation levels which are superimposed with the modulation signal are coprimes. It is appropriate that an unbiased modulation signal is used.

As a particularly preferred modulation signal which combines all of these properties and which can easily be set to the required proportions with regard to the amplitude, and which can additionally be generated with just a low level of complexity, a sawtooth signal is used.

Instead of overlaying the received signals with the modulation signal, the quantisation levels can also be displaced, subject to a modulation signal of the type described above. In a similar manner, the received pulses are also scaled, subject to a modulation signal of the type described above. Alternatively, or in addition, the phases of the received pulses are displaced, subject to a modulation signal of the type described above. As a further preferred embodiment of the invention, the time location of the emitted impulse signals and/or the signal propagation time is varied, subject to a modulation signal of the type described above.

With regard to the device, the aforementioned object is achieved by the features described herewith. The device comprises a distance sensor with a transmitter and receiver which is in particular carried, or can be carried, by a motor vehicle, the transmitter for emitting electromagnetic impulse signals and the receiver for receiving signals reflected by an object being provided in the form of a related sequence of pulses. Furthermore, the device comprises a means of modulation for overlaying the received pulses with a modulation signal, a means of discretisation, e.g. an analogue-digital converter (AD converter) known in its own right, for discretising each pulse in order to attain a sensed pulse, together with means of processing, e.g. a microprocessor, microcontroller, ASIC or similar, for adding together the sensed pulses.

The advantage of the invention and its embodiments lies in particular therein, that a particularly simple, and thus low-cost AD converter with a low amplitude resolution can be used for a wide dynamic range.

BRIEF DESCRIPTION OF THE DRAWINGS

An exemplary embodiment of the invention will be explained in further detail below with reference to a drawing, in which.

DETAILED DESCRIPTION OF THE DRAWINGS

Figure 1:
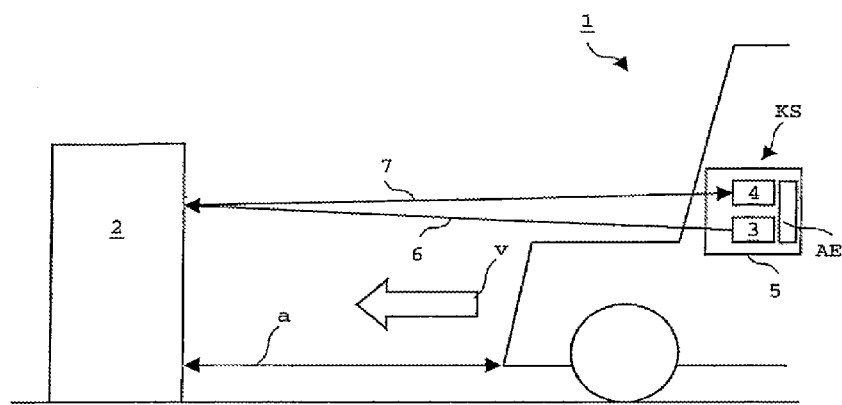
FIG. 1 shows a motor vehicle moving towards an object with a device for detecting the object

Those objects or elements which correspond to each other are labelled with the same reference numerals in all Figures.

FIG. 1 shows a schematic view of a motor vehicle 1 which is moving towards an object 2. The vehicle has a collision detection, collision warning or collision prevention system, referred to in the following as the collision detection system CS, or in brief as the collision detector. The collision detection system CS comprises at least one transmitter 3 and one receiver 4. Together with an evaluation unit EU, the transmitter 3 and the receiver 4 form a distance and/or a speed sensor 5, referred to in the following in brief as the distance sensor 5.

The transmitter 3 emits an electromagnetic impulse signal 6 during a measuring cycle, i.e. the transmitter 3 emits a sequence of individual signals during the measuring cycle-referred to in the following in brief as the signal 6. When the signal 6 hits an object 2, it is reflected by the object 2. A reflected signal 7 which is thus produced then travels to the receiver 4, so that in the known manner, the distance of the object 2 from the vehicle 1 is determined based on the emitted signal 6 and the reflected signal 7. Based on the known speed v of the vehicle 1, it is possible to calculate the time duration up to a potential collision with the object 2, and to take appropriate measures accordingly in order to prevent the collision, or to minimise the effects of the collision, i.e. to issue a warning to the driver, to automatically intervene in the steering and/or brake system of the vehicle etc.

If the object 2 is itself moving, for example when it is another vehicle, e.g. an approaching vehicle, not only the distance to the object 2 can be calculated, but the speed of the object 2 can be calculated from the change in time of the clearance or the distance a, simultaneously including the current speed of the device's own vehicle 1, while the distance and the speed of the object 2, together with the vehicle's own speed, can be used to calculate a potential risk of collision, as well as the length of time before a potential collision.

Figure 2:
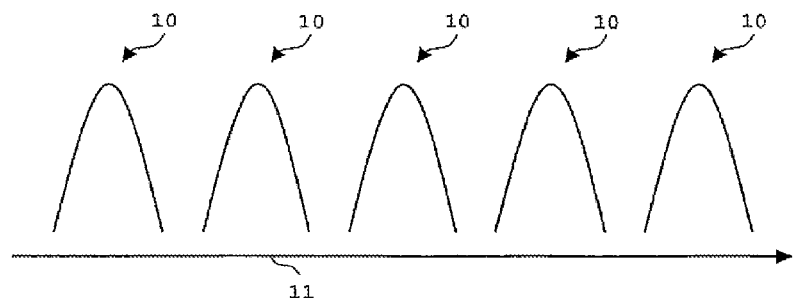
FIG. 2 shows a sequence of pulses received following reflection by an object over a time axis

FIG. 2 shows the reflected signal 7 as a sequence of received pulses 10 over a time axis 11. In addition, the transmitter 3 emits as a signal 6 a sequence of pulses during each measuring cycle, which are received after being reflected by the object 2 by the receiver 4 as reflected signals 7 and a sequence of received pulses 10. The sequence of received pulses 10 shown stops at the receiver 4. This is known in the prior art.

Figure 3:
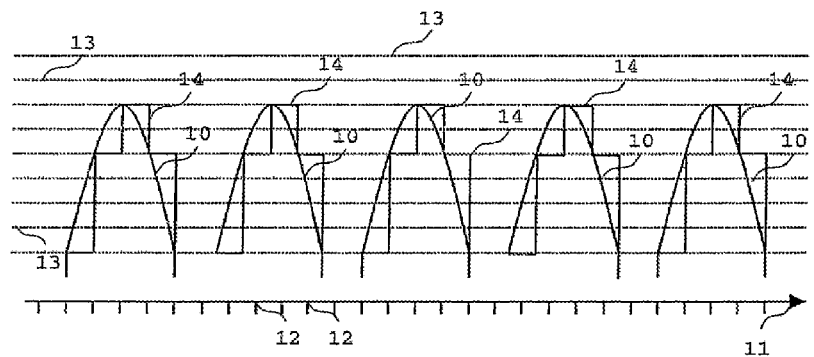
FIG. 3 shows a known sensing or discretisation process for the received pulses

Equally, the sensing or discretisation of the received pulses 10 shown in FIG. 3 is known in the prior art. For this purpose, the current value of each of the received pulses 10 is calculated along the time axis 11 in equidistant sensing time points, in relation to specified or specifiable equidistant quantisation levels 13. The sensing produces a sensed pulse 14 for each received pulse 10.

Figure 4:
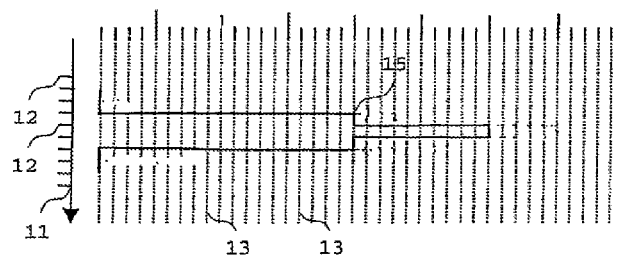
FIG. 4 shows a total pulse as the result of a known addition of the sensed pulses

As shown in FIG. 4 as being also known in the prior art, the sensed pulses 14 are added together to form a total pulse 15, in order to achieve an increase in the evaluated received signals, namely the received pulses 10. Here, an increase in the dynamic of the received signal is not achieved, since each individual support point of the total pulse continues to be located on one of the equidistant quantisation levels 13. The signal is therefore simply elongated; the additional information content is not used due to a quasi simultaneous examination of a sequence of received pulses 10.

For reasons of clarity, the view in FIG. 4 is rotated by 90° compared to the views in FIGS. 2 and 3, i.e. the time axis 11 runs vertically.

Figure 5:
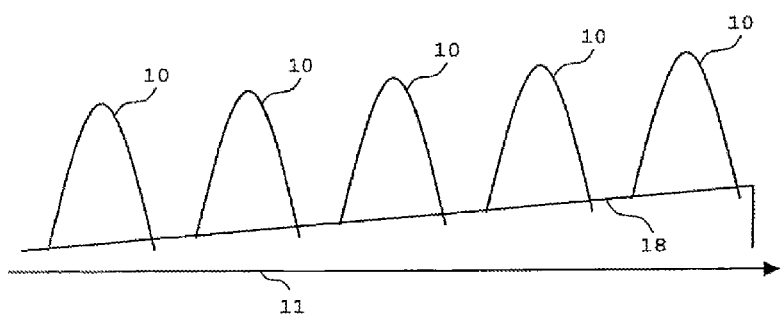
FIG. 5 shows a variant of the procedure according to the invention, incorporating a modulation signal

FIG. 5 shows a version of the procedure according to the invention. According to said procedure, with a sequence of received pulses 10, each received pulse 10 is increased by the current value of a modulation signal 18 respectively. Here, a sawtooth signal is shown as the modulation signal 18. The respective pulse 10 is increased by adding together the received pulses 10 and the modulation signal 18. For the addition procedure, either the modulation signal 18 can be used in the form shown, namely the periodically continuously rising form, or for each received pulse 10, the value of the modulation signal 18 can be used constantly when the received pulse 10 begins. In the latter case, the sawtooth modulation signal 18 would be reduced to a periodical, cascading modulation signal (not shown).

The use of the continuously rising modulation signal 18 would lead to a linear distortion of the individual received pulses 10, since the respective addend which is applied to the received pulse 10 increases together with the increasing duration of the pulse. This linear distortion, which may by all means be desirable, is prevented in a particularly simple manner by using the cascading version of the modulation signal instead of the continuously rising modulation signal 18. Here, when the respective pulse 10 begins, the current value of the modulation signal 18 is determined and this (constant) value' is applied to the received pulse 10 throughout its entire duration.

FIG. 5 shows the situation in which a constant value, which is subject to the modulation signal 18, is applied to the received pulses 10.

Figure 6:
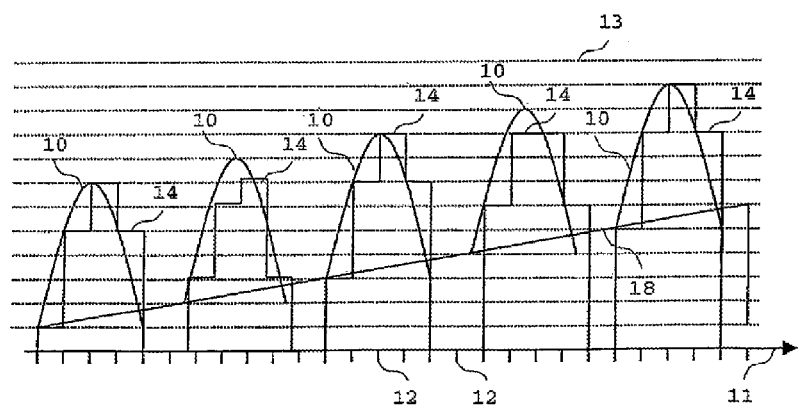
FIG. 6 shows a sensing process for the received pulses to which the modulation signal has been applied

FIG. 6 shows that the received pulse 10 to which the modulation signal 18 has been applied can also be sensed, resulting in a sensed pulse 14 for each received pulse 10. The individual sensed pulses 14 are in turn added together, and the mean value is formed from the ensuing total pulse (not shown), in order to attain a resulting signal 16.

Figure 7:
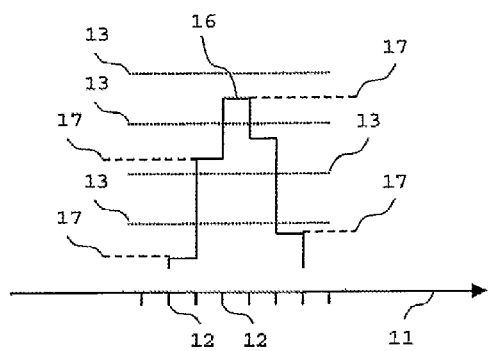
FIG. 7 shows a representation of the signal which results when the pulses have been added together and a mean has been formed

FIG. 7 shows a representation of a signal 16 which results after the addition procedure, and when the received pulse 10 has been superimposed with the modulation signal 18. Here, the resulting signal 16 is attained from support points which may be located between the equidistant quantisation levels 13. In other words, in an advantageous manner, "virtual quantisation levels" 17 ensue between the equidistant quantisation levels 13. This virtually corresponds to the sensing of the sequence of pulses 10 with a very fine discretion range which approaches zero as the number of pulses 10 increases within the examined pulse sequence. In the result, this leads to a significantly higher resolution of the received pulses 10 due to the higher discretisation of the resulting signal 16 as an image of the received pulses 10. It is very easy to identify that the resulting signal 16 presents a far more precise image of a received pulse 10 than each sensed pulse 14.

Figure 8:
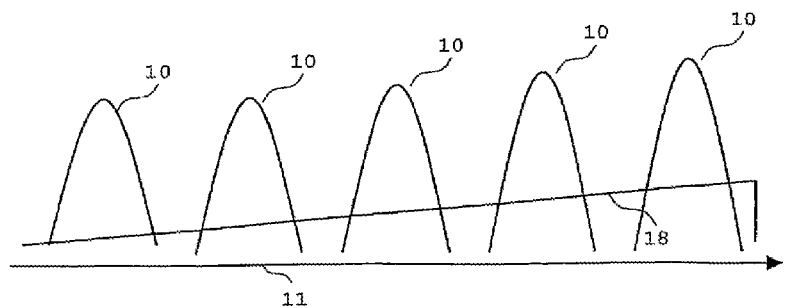
FIG. 8 shows a scale of the received pulses with the modulation signal

A similar result is achieved when, as shown in FIG. 8, the received pulses 10 are scaled with the respective current value of the modulation signal 18 in an advantageous manner. This enables the amplitude of the received pulses 10 to be modulated in a simple form. The scaled received pulses 10 are in turn (not shown) sensed according to the quantisation levels 13, resulting in sensed pulses 14. These are added together. The resulting signal which ensues (not shown separately) comprises, in the same way as the resulting signal 16 shown in FIG. 5, support points on virtual quantisation levels 17.

The additive application of the modulation signal 18 to the received pulses 10, as shown in FIG. 6, can also be referred to as "offset modulation". The multiplicative application of the modulation signal 18 to the received pulses 10, as shown in FIG. 8, is also referred to as "amplitude modulation".

When amplitude modulation is used, the required effect is approximately achieved, since the effect depends on the amplitude of the modulation signal 18. However, if the modulation is conducted over a sufficiently wide scaling range, additional virtual quantisation levels 17 also ensue according to this variant of the invention. The amplitude modulation primarily takes effect in the pulse centre range (in the so-called "peak").

A variant consists of the fact that not the received pulses 10, but the impulse signal or signal 6 which forms the basis of the received pulses 10 is scaled in the manner shown in FIG. 8.

A further variant ensues when instead of the received pulses 10, the quantisation levels 13 are scaled or displaced subject to the modulation signal 18.

Figure 9:
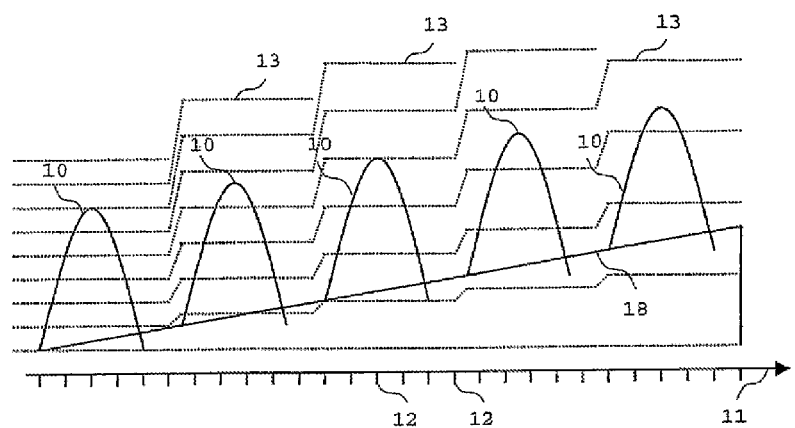
FIG. 9 shows a scale of the quantisation levels subject to the modulation signal.

This scaling of the quantisation levels 13 subject to the modulation signal 18 is shown in diagrammatical form in FIG. 9. The received pulses 10 are preferably sensed due to the fact that the quantisation levels 13 are no longer equidistant during the sequence of received pulses 10. As a result, different forms of the respective sensed pulses (not shown) also ensue. In general, it can be said that the last received pulses 10 are sensed with decreasing precision within a related sequence of received pulses 10. The adding together and the superimposed modulation produce a large number of virtual quantisation levels 17 due to the different respective form of the sensed impulses.

Finally, a variant of the invention ensues when the distance of the sensing time points 12 is scaled subject to the modulation signal 18. This variant corresponds in principle to the variants shown in FIG. 9, in which the distance of the quantisation levels 17 is scaled subject to the modulation signal 18. The scaling of the distance of the sensing time points 12 is therefore not shown separately. In this version, each received pulse 10 is also sensed at the respective ensuing sensing time points 12, in order to attain sensed pulses 14. These are added together in turn, so that after the mean value is formed, a resulting signal with additional virtual quantisation levels 17 is produced. This variant also approximately achieves the desired effect, since the effect of the time gradients of the modulation signal 18 is subject to the respective sensing time point 12.

If the scaling is conducted over an adequately broad range, additional virtual quantisation levels 17 can also, according to this variant, be shown. This variant primarily affects the pulse edges. Furthermore, this variant is referred to as phase modulation in order to differentiate it from the variants described above.

An additional variant ensues when instead of the sensing time points 12, the time location of the pulse of the emitted impulse signal 6 or the signal propagation time is varied.

Further variants result from appropriate combinations of individual or several of the variants described here. It is advantageous, for example, to have a combination of an amplitude modulation and a phase modulation with respective individual modulation signals 18, since the amplitude modulation causes the centre of the received pulse 10 to be more finely resolved, and the phase modulation causes the edges of the received pulse 10 to be more finely resolved.

In this way, the invention can be summarised as follows:

A procedure for measuring distance between a distance sensor which is carried, in particular, by a motor vehicle and an object by emitting electromagnetic impulse signals and by receiving signals which are reflected by the object, and for subsequently determining the signal propagation time, and a device suited for carrying out this procedure, in which pulses received after having been reflected by the object are discretised and added together, in which according to embodiments of the procedure, a modulation signal is applied to or superimposed onto the received pulses.

LIST OF REFERENCE NUMERALS

1. Vehicle
2. Object
3. Transmitter
4. Receiver
5. Distance sensor
6. Impulse signal
7. Reflection
10. Received pulse
11. Time axis
12. Sensing time point
13. Quantisation level
14. Sensed pulse
15. Total pulse
16. Resulting signal
17. Virtual quantisation level
18. Modulation signal
a Distance
EU Evaluation unit
CS Collision detection system
v Speed of the vehicle 1

The invention claimed is:

1. A method for measuring a distance between a distance sensor (5), which is carried by a vehicle (1), and an object (2), the method comprising:
   emitting electromagnetic impulse signals (6); and
   receiving signals (7) which are reflected by the object (2), wherein the signal (7) which is reflected by the object (2) comprises a related sequence of pulses (10), each pulse (10) being separated in order to attain a sensed pulse (14), and the sensed pulses (14) and added together and a modulation signal (18) is superimposed onto the received pulses (10) prior to separation and addition wherein the modulation signal (18) comprises a related sequence of pulses (10) of constant amplitude distribution, wherein the modulation signal (18) is distributed uniformly in terms of time, and its amplitude corresponds to a quantization level (13) during separation of the received pulses, or to an integral multiple of such a quantization level.

2. A method according to claim 1, wherein the number of the sensed pulses (14) which belong together and the number of quantization levels (13) which are superimposed with the modulation signal (18) are coprimes.

3. A method according to claim 1, wherein the modulation signal (8) is an unbiased modulation signal.

4. A method according to any one of claim 1, wherein the modulation signal (18) is a sawtooth signal.

5. A method according to claim 1, wherein the quantisation levels (13) are displaced or scaled subject to the modulation signal (18).

6. A method according to claim 1, wherein the received pulses (10) are scaled subject to the modulation signal (18).

7. A method according to claim 1, wherein phases of the received pulses (10) are displaced subject to the modulation signal (18).

8. A method according to claim 1, wherein the time location of at least one of the emitted impulse signals (6) and the signal propagation time is varied, subject to the modulation signal (18).

9. A device for measuring a distance between a distance sensor (5), which is carried by a vehicle (1), and an object (2), the device comprising:
   a transmitter (3) being equipped to transmit electromagnetic impulse signals (6); and
   a receiver (4) for receiving signals which are reflected from an object, wherein the receiver is adapted for superimposing a modulation signal (18) onto a received pulse (10) in order to receive signals (7) which are reflected by an object (2) in the form of a related sequence of pulses (10), with each pulse (10) separated in order to attain a sensed pulse (4) and to add together the sensed pulses (14), wherein the modulation signal (18) includes a related sequence of pulses (10) of constant amplitude distribution and is distributed uniformly in terms of time and its amplitude corresponds to a quantization level (13) during separation of the received pulses, or to an integral multiple of such quantization level.

* * * * *